United States Patent [19]

Iimura et al.

[11] Patent Number: 4,786,709
[45] Date of Patent: Nov. 22, 1988

[54] ORGANIC HIGH MOLECULAR LIQUID CRYSTALS

[75] Inventors: Kazuyoshi Iimura, 2-1, Sayamadai, Sayama-shi, Sataima; Naoyuki Koide, 2-23-13, Kita, Kunitachi-shi, Tokyo; Mitsutaka Miyabayashi, Mie, all of Japan

[73] Assignees: Mitsubishi Petrochemical Co., Ltd., Tokyo; Kazuyoshi Iimura, Sayama; Naoyuki Koide, Kunitachi, all of Japan

[21] Appl. No.: 44,209

[22] Filed: Apr. 30, 1987

[30] Foreign Application Priority Data

Apr. 30, 1986 [JP] Japan ................... 61-99794

[51] Int. Cl.⁴ ............... C09K 19/52; C08G 63/02
[52] U.S. Cl. .................. 528/298; 528/301; 528/306; 252/299.01; 252/299.62; 252/299.66
[58] Field of Search ............ 252/299.01, 299.62, 252/299.66; 528/298, 300, 301, 306

[56] References Cited

U.S. PATENT DOCUMENTS

| | | | |
|---|---|---|---|
| 4,439,015 | 3/1984 | Rich et al. | 252/299.66 X |
| 4,526,704 | 7/1985 | Petrzilka et al. | 252/299.66 X |
| 4,624,872 | 11/1986 | Stuetz | 252/299.6.01 X |
| 4,710,700 | 12/1987 | Osaka et al. | 324/585 R X |
| 4,744,918 | 5/1988 | Heppke et al. | 252/299.66 X |

Primary Examiner—Brian E. Hearn
Assistant Examiner—Stephen J. Kalofut
Attorney, Agent, or Firm—Oblon, Fisher, Spivak, McClelland & Maier

[57] ABSTRACT

An organic high molecular liquid crystal containing the moiety shown by the following structural formula (1) as the recurring unit and having a number average molecular weight of from 1,000 to 100,000:

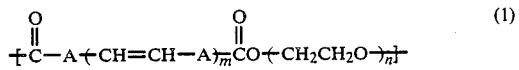

wherein m represents an integer of from 2 to 10; n represents an integer of from 1 to 12; and —A— represents an aromatic group.

The high molecular liquid crystal of this invention can be used for performing optical recording by utilizing the thermooptical effect thereof and also can be used as a fluorescence scattering liquid crystal element since the liquid crystal has a property of emitting fluorescence.

11 Claims, No Drawings

ORGANIC HIGH MOLECULAR LIQUID CRYSTALS

FIELD OF THE INVENTION

This invention relates to a high molecular substance showing a liquid crystal behavior (hereinafter, is referred to as high molecular liquid crystal).

More particularly, the invention relates to a thermotropic liquid crystal showing a liquid crystal phase at temperatures higher than the glass transition temperature thereof. Furthermore, the invention relates to a novel high molecular liquid crystal having a conjugated system in the main chain thereof.

BACKGROUND OF THE INVENTION

Recently, liquid crystal substances have made startling progress in the application thereof, such as quick responsive displays utilizing the electrooptical characteristics thereof, etc. These liquid crystal substances are almost composed of organic compounds having a relatively low molecular weight.

On the other hand, high molecular liquid crystals which are high molecular substances capable of forming liquid crystal phase have now been actively investigated.

That is, since the Elliot et al's discovery in 1950 that a chloroform solution of poly($\gamma$-benzyl-L-glutamate) showed a double refractivity in the course of the evaporation of the solvent [Discussion of Faraday Society, 9, 246, (1950)], which became the beginning of the investigation of high molecular liquid crystals, the investigation on such high molecular liquid crystals has been continued.

In particular, since the discovery of that high strength and high elastic fibers could be spun from a liquid crystal orientation solution of poly(p-phenyleneterephthalamide) by E. I. Du Pont de Nemours and Company in 1968 (British Pat. No. 1,283,064), high molecular liquid crystals have been actively investigated aiming at the development of high strength and high elastic fibers.

The aforesaid high molecular liquid crystals are all lyotropic liquid crystals. On the other hand, thermotropic high molecular liquid crystals have begun to appear since the 1970's as seen in the Jackson et al's discovery of the thermotropic liquid crystal characteristics of a random copolymer of poly(ethylene terephthalate) and poly(p-oxybenzoyl) [Journal of Polymer Science, Polymer Chemistry Edition, 14, 2093, (1976)], etc. Thus, thermotropic high molecular liquid crystals have been actively investigated aiming at the development of fibers having dynamic characteristics of high performance by melt spinning.

In any cases, the application of high molecular liquid crystals as functional materials is expected utilizing the advantage as high molecular substances capable of forming films, fibers, etc., and the advantage capable of forming liquid crystal phase.

In particular, the investigations for not only the dynamic characteristics of high molecular liquid crystals but also the development of new characteristics and the application thereof have been desired.

SUMMARY OF THE INVENTION

The inventors have made various efforts for the development of new high molecular liquid crystals from the aforesaid viewpoint and as the results thereof have succeeded in attaining the invention.

An object of this invention is, therefore, to provide a high molecular liquid crystal having a novel structure. More particularly, the object of this invention is to provide a novel high molecular liquid crystal containing a specific conjugated system in the recurring unit of the main chain.

A further object of this invention is to provide a novel high molecular liquid crystal which can be applied as functional materials such as optical materials, electrooptical materials, etc., as will be described hereinbelow.

That is, according to this invention, there is provided an organic high molecular liquid crystal containing the recurring unit represented by the following structural formula (1) and having a number average molecular weight of from 1,000 to 100,000:

wherein m represents an integer of from 2 to 10; n represents an integer of from 1 to 12; and —A— is selected from the group consisting of

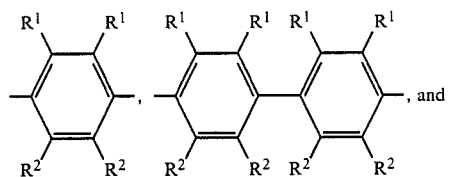

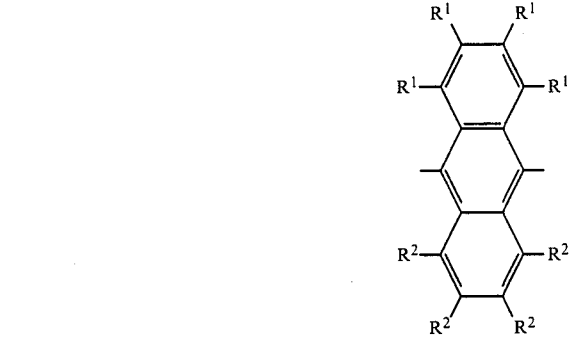

(wherein $R^1$ and $R^2$ each is selected from the group consisting of a hydrogen atom, a halogen atom, an alkyl group having 1 to 3 carbon atoms, an amino group, a methyl-substituted amino group, an alkoxy group having 1 to 3 carbon atoms, a cyano group, and a nitro group).

DETAILED DESCRIPTION OF THE INVENTION

Then, the organic high molecular liquid crystals of this invention are explained below in detail.

In the structural formula (1) described above, m shows the length of the conjugated system and m is preferably as large as possible on the function of increasing the non-linear optical susceptibility, while m is preferably as small as possible from the point of easiness for the preparation of the high molecular liquid crystal. Thus, m is selected from the viewpoints of the function of the high molecular liquid crystal to be utilized, the requirement for the facility of producing the high molecular liquid crystal, etc.

Furthermore, m can be also selected for obtaining desired emission spectra such as fluorescent emission, etc. In this respect, m is preferably from 2 to 4, more preferably 2 or 3, and particularly preferably 2.

In the structural formula (1) described above, n is an integer of from 1 to 12, which shows the length of the spacer in the molecule, and influences each phase transferring behavior of from a solid phase to an intermediate phase and from the intermediate phase to an isotropic fluid phase. From the viewpoint, n is preferably from 2 to 12, more preferably from 2 to 8, further more preferably from 4 to 8.

In the structural formula (1) described above, —A— is selected from the group consisting of

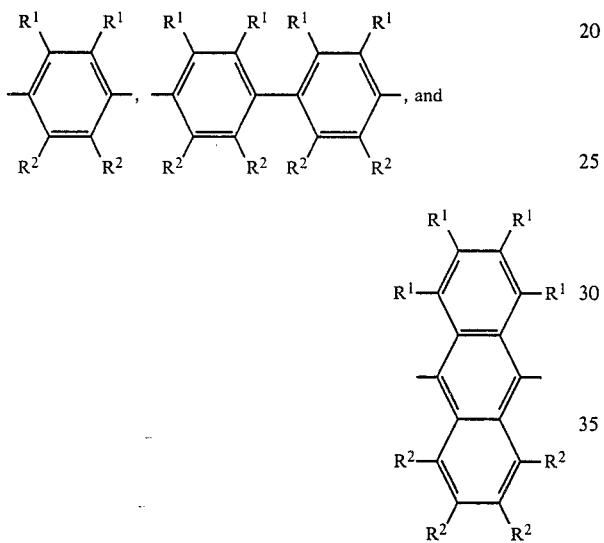

(wherein $R^1$ and $R^2$ each has the same significance as defined above). Also, in the structural formula (1) representing the recurring unit, plural —A—'s may be the same or different. —A— preferably represents

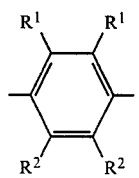

(wherein $R^1$ and $R^2$ each has the same significance as defined above).

Then, preferred examples of the structure of the moiety shown by —A—(CH=CH—A)$_{\overline{m}}$ in the structural formula (1) are illustrated below.

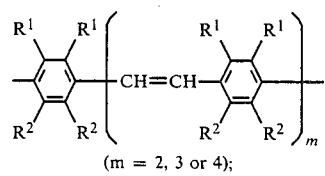

(m = 2, 3 or 4);

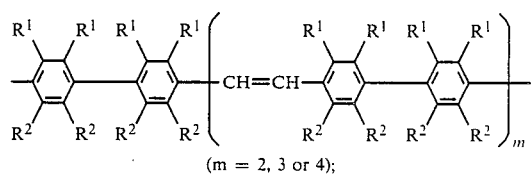

(m = 2, 3 or 4);

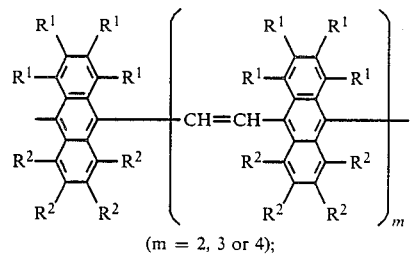

(m = 2, 3 or 4);

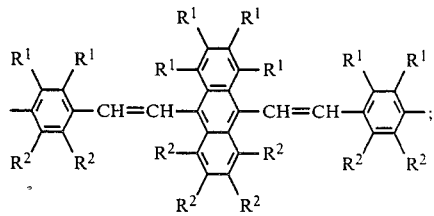

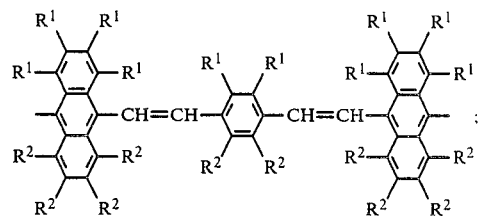

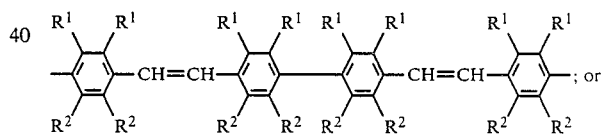

; or

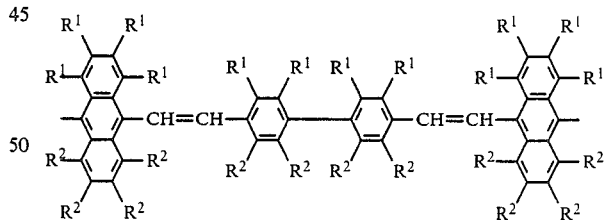

(wherein $R^1$ and $R^2$ each has the same significance as defined above)

More preferred examples of the structure of the moiety shown by —A—(CH=CH—A)$_{\overline{m}}$ in the structural formula (1) are illustrated below.

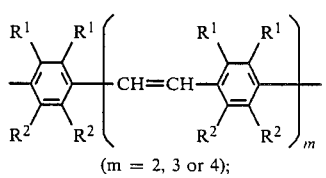

(m = 2, 3 or 4);

-continued

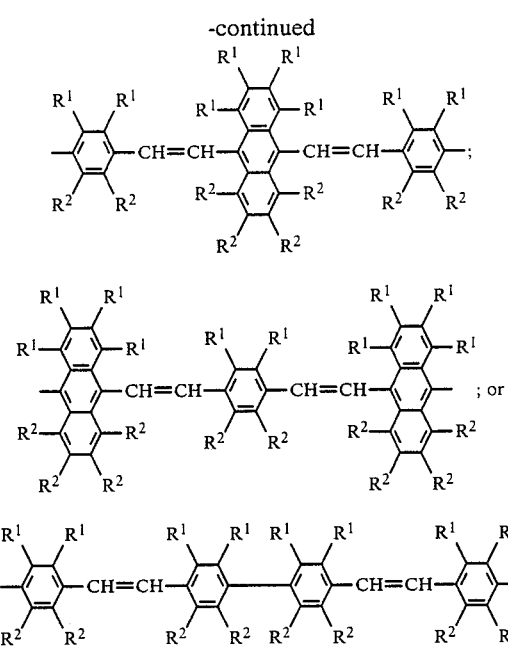

(wherein $R^1$ and $R^2$ each has the same significance as defined above).

In the structural formula (1) described above, $R^1$ and $R^2$ each is selected from the group consisting of a hydrogen atom, a halogen atom, an alkyl group having 1 to 3 carbon atoms, an amino group, a methyl-substituted amino group, an alkoxy group having 1 to 3 carbon atoms, a cyano group and a nitro group. $R^1$ is preferably selected from the group consisting of a hydrogen atom, a methyl group and a methoxy group, and $R^2$ is preferably selected from the group consisting of a hydrogen atom, a cyano group and a nitro group.

In the structural formula (1) described above, plural $R^1$'s or plural $R^2$'s may be the same or different.

From the viewpoint of the easiness for producing the high molecular liquid crystal, $R^1$ and $R^2$ each is preferably selected from the group consisting of a hydrogen atom, a halogen atom and an alkyl group having 1 to 3 carbon atoms and is particularly preferably a hydrogen atom.

In particular, for obtaining a non-linear optical function, it is preferred to impart a dipole moment to the liquid crystal and in this case, an electron donative group is used for $R^1$ and an electron attractive group is used for $R^2$. In such a case, $R^1$ is selected from the group consisting of a hydrogen atom, a halogen atom, an alkyl group having 1 to 3 carbon atoms, an amino group, a methyl-substituted amino group and an alkoxy group having 1 to 3 carbon atoms, and $R^2$ is selected from the group consisting of a cyano group and a nitro group.

Also, in the high molecular liquid crystal of this invention containing the moiety shown by the structural formula (1) described above as a recurring unit, an average content (Ct) of the trans type bonds to the carbon-carbon double bonds has an intimate relation with the phase transferring behavior of from a solid phase to an intermediate phase and from the intermediate phase to an isotropic fluid phase.

As Ct is larger, the intermediate phase temperature region ($\Delta T$) of the high molecular liquid crystal obtained is broader. Thus, Ct is preferably at least about 60%, more preferably at least about 80%, and particularly preferably at least about 90%.

The high molecular liquid crystal of this invention has a number average molecular weight of from 1,000 to 100,000, preferably from 3,000 to 70,000, more preferably from 8,000 to 50,000, and particularly preferably from 10,000 to 30,000.

The high molecular liquid crystal of this invention can be synthesized by a direct esterification reaction of a dicarboxylic acid compound represented by the following structural formula (2) and a diol compound having an oxyethylene chain represented by the following structural formula (3):

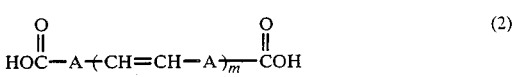

wherein —A— and m have the same significance as defined above in regard to the structural formula (1);

$$HO(CH_2CH_2O)_nH \quad (3)$$

wherein n has the same significance as defined above in regard to the structural formula (1).

Also, the high molecular liquid crystal of this invention can be synthesized by a transesterification reaction of an ester compound represented by the following structural formula (2a) and a diol compound represented by the structural formula (3) described above:

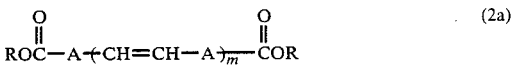

wherein —A— and m have the same significance as defined above in regard to the structural formula (1) and R represents an alkyl group.

Also, other known polyester synthesis method can be used for the production of the high molecular liquid crystal of this invention [e.g., Shunsuke Murahashi et al., *Gosei Kobunshi V* (*i.e., Synthetic High Molecule V*), pages 188–191, published by Asakura Shoten].

For the polymerization, a melting polycondensation method wherein reaction system is heated to temperature higher than the melting points of monomers and polymer formed and the polycondensation reaction is performed in a homogeneous liquid phase system can be used.

Furthermore, as the case may be, a solid phase polycondensation method can be also used.

Still further, the production of the high molecular liquid crystal of this invention may be performed by a surface polycondensation method wherein a compound formed by converting the carboxylic acid of the compound shown by the structural formula (2) described above into an acid chloride or chloroformate is dissolved in an organic solvent, the diol compound shown by the structural formula (3) described above is dissolved in water, and both solutions are brought into contact with each other to synthesize an ester at the interface thereof.

Also, a solution polycondensation method wherein the polymerization is performed in a solvent for the monomers and polymer can be used.

Then, the characteristics of the high molecular liquid crystals of this invention are described.

(i) Phase Transferring Behavior

The high molecular liquid crystal of this invention has at least two transition points, i.e., the transition point from a solid phase to an intermediate phase (liquid crystal phase) and the transition point from the intermediate phase to an isotropic fluid phase.

Furthermore, the high molecular liquid crystal of this invention can have three or more transition points, i.e., the transition point from a solid phase to an intermediate phase, the transition point from the intermediate phase to another intermediate phase, and the transition point from the latter intermediate phase to an isotropic fluid phase.

The transition point can be confirmed in, for example, a differential scanning calorimetric analysis. For example, the transition point from a solid phase to an intermediate phase and the transition point from the intermediate phase to an isotropic fluid phase can be confirmed by two endothermic peaks in the temperature raising course.

Also, the change of the optical texture with the transition from a solid phase to an intermediate phase and the change of the optical texture with the transition from an intermediate phase to an isotropic fluid phase can be confirmed by a polarization microscope.

The high molecular liquid crystal of this invention is a thermotropic liquid crystal which shows an intermediate phase in the temperature range of at least the transition temperature from a solid phase to an intermediate phase and up to the transition temperature from the intermediate phase to an isotropic fluid phase.

The intermediate phase forms a smectic liquid crystal phase but, as the case may be, may form a cholesteric liquid crystal phase or a nematic liquid crystal phase.

The type of thermotropic liquid crystal phase can be discriminated using, for example, (1) the observation of the optical texture by a polarization microscope, (2) an X-ray diffraction method, (3) a miscibility test, (4) a thermal analysis, (5) the observation of the viscosity, turbidity, coloration, etc., by heating in capillary, etc.

The intermediate phase temperature range means the temperature range of at least the transition temperature from a solid phase to an intermediate phase and up to the transition temperature from an intermediate phase to an isotropic fluid phase but the liquid crystal phase temperature range is advantageously as broad as possible. That is, if the temperature range is broad, the operation of orientation, etc., can be performed in the stable liquid crystal phase range.

The temperature width of the liquid crystal phase temperature range, the transition temperature from a solid phase to an intermediate phase, and the transition temperature from an intermediate phase to an isotropic fluid phase have an intimate relation with the structure of the structural formula (1) as described above, that is, the content (Ct) of the trans type bonds to the carbon-carbon double bonds, the chain length of the oxyethylene chain (also acts as a spacer), the length of the mesogen group (the value of m in the structural formula (1)), and the structure of the mesogen group (the structure of —A— in the structural formula (1)).

For example, as the average content (Ct) of the trans type bonds is higher, the liquid crystal temperature range becomes broader. That is, as the linearity of the mesogen group is higher, the contribution to the faculty of forming the liquid crystal and the stabilization of the orientation is considered to become higher. For example, in the high molecular liquid crystal of this invention having a recurring unit shown by the structural formula (1), wherein —A— is

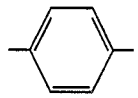

and m is 2, an all trans type high molecular liquid crystal has the broadest liquid crystal phase temperature range and the transition temperature from a solid phase to an intermediate phase is high. Also, if Ct is up to 60%, the liquid crystal does not show an intermediate phase and if Ct is up to 50%, the glass transition point only is observed.

The oxyethylene chain length (the value of n in the structural formula (1) is as follows. In the high molecular liquid crystal of this invention having the recurring unit shown by the structural formula (1), wherein —A— is

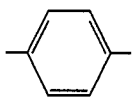

and m is 2, if the oxyethylene chain length becomes longer as 4 to 8, the liquid crystal phase temperature range becomes narrower and the transition temperature from a solid phase to an intermediate phase and the transition temperature from an intermediate phase to an isotropic fluid phase become lower.

In the high molecular liquid crystal of this invention, the width of the liquid crystal phase temperature range thereof can be established preferably at least 10° C., more preferably at least 30° C., and particularly preferably at least 50° C., by suitably selecting the average content (Ct) of the trans type bond, the oxyethylene chain length (n), the length (m) of the mesogen group, the structure of the mesogen group, etc.

Also, in the case of using the high molecular liquid crystal of this invention by orienting it in the intermediate phase (liquid crystal phase) and fixing the orientation at ordinary temperature, the transition temperature from the solid phase to the intermediate phase is preferably at least room temperature, more preferably at least 50° C., and particularly preferably at least 60° C.

Furthermore, if, on the contrary, the transition temperature from the solid phase to the intermediate phase is too high, the temperature for forming the intermediate phase becomes high to cause a problem of requiring high temperature for performing the operations such as the orientation, etc.

In particular, excluding the case of requiring a heat resistance, the transition temperature from the solid phase to the intermediate phase is preferably up to 400° C., more preferably up to 300° C., and particularly preferably up to 200° C.

In the high molecular liquid crystal of this invention, the transition temperature from a solid phase to an intermediate phase can be properly established by selecting the average content (Ct) of the trans type bonds, the oxyethylene chain length (n), the length (m) of the mesogen group, etc.

(ii) Other Characteristics

Since the high molecular liquid crystal of this invention has a long conjugated system in the mesogen group of the main chain and also can control the substantially effective length of the conjugated system, the high molecular liquid crystal of this invention has the following characteristics.

For example, the high molecular liquid crystal of this invention provides a high molecular liquid crystal having a light-emitting action such as fluorescence, etc. That is, the high molecular liquid crystal of this invention has a light-emitting action which is considered to be originated in the energy level structure of the mesogen group having the conjugated system.

Then, the application of the high molecular liquid crystal of this invention is described.

That is, the high molecular liquid crystal of this invention can be applied as a thermorecording material or a heat address type display material by utilizing the thermooptical effect thereof.

For example, when the homeotropically oriented transparent high molecular liquid crystal film of this invention is heated by the irradiation of laser to transfer the phase of the high molecular liquid crystal film into an isotropic liquid phase and then the film is suddenly cooled, a polydomain structure is formed and the change of the light scattered state is recorded and retained.

Thus, recording of information and writing of images can be performed by utilizing the aforesaid phenomenon.

The information or images thus recorded or written can be erased by heating the high molecular liquid crystal film to transfer again the phase of the high molecular liquid crystal film into an isotropic liquid phase and thereafter slowly cooling the high molecular liquid crystal film, or by slowly cooling the high molecular liquid crystal film while applying thereto an electric field or a magnetic field, whereby the transparent homeotropic texture is formed.

Aforesaid recording of information or writing of images can be also performed by using a heating electrode in place of laser.

In particular, since the high molecular liquid crystal of this invention has the specific conjugated system in the mesogen group, has the absorption spectra (i.e., tone) based on the specific conjugated system, and has excellent orientation characteristics, recording of information and writing of images can be practiced at high contrast by using the high molecular liquid crystal of this invention.

Furthermore, since the high molecular liquid crystal of this invention has a function of emitting fluorescence or phosphorescence by absorption of exciting light, the high molecular liquid crystal can be applied to a display utilizing the function. In particular, the high molecular liquid crystal of this invention can be applied to a fluorescence scattering liquid crystal element effectively emitting fluorescence from the liquid crystal element by utilizing the focal conic texture as the light scattering center, to a light emitting liquid crystal element controlling the orientation of the liquid crystal group of the high molecular liquid crystal by electric field or magnetic field, etc.

Also, the high molecular liquid crystal of this invention can be expected to be applied as an electroluminescence by forming a thin film or layer of the high molecular liquid crystal between two electrodes and applying an electric potential onto the electrodes to emit light.

Moreover, the high molecular liquid crystal of this invention can be applied as a high efficient non-linear optical material or electrooptical material since the high molecular liquid crystal has the long conjugated system in the mesogen group of the main chain, a high non-linear optical susceptibility and electrooptical constant by $\pi$ electrons delocalized in the conjugated system can be expected, the conjugated system of the main chain can be highly oriented in one direction in the liquid crystal phase, and the orientation can be fixed at ordinary temperature.

In particular, the high molecular liquid crystal of this invention can be applied as a third-order non-linear optical material or second-order electrooptical material, e.g., an element for optical switches, optical amplifier, optical logic, optical phase conjugation, etc.

Still further, the high molecular liquid crystal of this invention can be also used as a second-order linear optical material or first-order electrooptical material by orienting the polarization of the high molecular liquid crystal having a structure that the hydrogen atom of the phenyl group of the recurring unit shown by the structural formula (1) described above is replaced with an electron-donative and/or electron-attractive substituent in one direction by the application of an electric field or a magnetic field in the liquid crystal phase, and then fixing the orientation at ordinary temperature.

The following examples are intended to explain this invention practically but not to limit it in any way.

EXAMPLE 1

A high molecular liquid crystal having the moiety shown by the following structure as recurring unit, wherein the carbon-carbon double bonds were all trans type bond, was prepared by the following method.

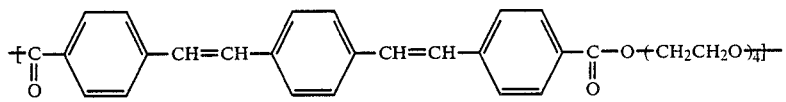

(1) Synthesis

In 175 ml of dimethylformamide were dissolved 1,513 g of p-xylene dichloride and 50 g of triphenylphosphine and they were reacted for 3 hours under refluxing. Thereafter, the reaction mixture was cooled to room temperature, washed twice with each 100 ml of dimethylformamide and then washed twice with each 100 ml of diethyl ether, and then dried under reduced pressure to provide white powdery p-xylylenebis(triphenylphosphonium chloride) (XTPPC) having the following structure at a yield of 90%.

XTPPC:

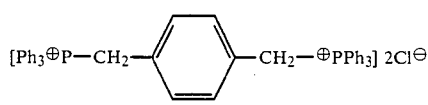

In 300 ml of ethanol containing 5.6 g of lithium ethylate were dissolved 30 g of XTPPC prepared in the above step and 15.5 g of methyl terephthalaldehydate and they were reacted for 2 days at room temperature. The reaction mixture was filtrated to obtain a solid deposited, the solid obtained was washed with 100 ml of water, and, thereafter, ethanol soluble components were extracted.

The extract was concentrated to make 50 ml and allowed to stand at room temperature to provide a cis-cis and cis-trans mixture of 1,4-bis(4'-ethoxycarbonylstyryl)benzene (BECSB) having the following structure as light fluorescent color crystals at a yield of 67%.

BECSB:

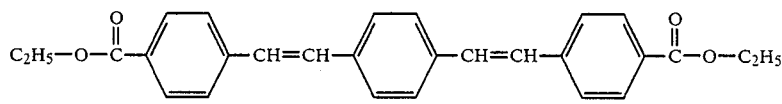

Then, BECSB thus-obtained and tetraethylene glycol were condensed at a mol ratio of 1:1.3 by heating to 170° C. to 180° C. for 4 hours in the existence of a small amount of lead acetate and then after adding thereto a small amount of stannous oxide, the mixture was heated to 190° C. to 200° C. under reduced pressure of 5 mm Hg for 4 hours to perform the condensation. Furthermore, the condensation further proceeded for 4 hours at 210° C. to 230° C. under reduced pressure of 0.1 mm Hg to provide a high molecular condensation polymer. The product was dissolved in 75 ml of chloroform and then 300 ml of ethanol was added to the solution to form precipitates of the purified product. Thus, a polymer was obtained at a yield of about 80 to 90%.

The 1,4-bis-styrylbenzene moiety of the polymer obtained was trans-isomerized by a photosensitizing reaction with the addition of a catalytic amount of iodine to a solution of the polymer in 100 ml of benzene.

In this case, polyesters having different contents of the trans type bonds were obtained by adjusting the refluxing temperature and the refluxing time of the benzene solution of the polymer. The polyester having the recurring unit shown by the structural formula (1) wherein n was 4 could be isomerized into an all trans type by refluxing the benzene solution for 24 hours at 80° C. That is, the average content of the trans type bonds to all the carbon-carbon double bonds in the polymer obtained was confirmed to be almost 100% by $^1$H NMR and ultraviolet and visible light absorption spectra.

Also, the number average molecular weight of the polymer obtained was 12,000 by gel permeation chromatography.

Furthermore, the product obtained was confirmed to be a polymer having the aforesaid structure as the recurring unit by the infrared absorption analysis, elemental analysis, NMR, etc.

(2) Characteristics

By investigating the thermal characteristics of the high molecular liquid crystal obtained in the above method using a differential scanning calorimeter, the endothermic peak corresponding to the transition point from a solid phase to an intermediate phase and the endothermic peak corresponding to the transition point from an intermediate phase to an isotropic fluid phase were observed at 199° C. and 333° C., respectively, during the temperature raising course.

Also, as the result of the investigations by a heating type polarization microscope, the intermediate phase of the high molecular liquid crystal obtained was confirmed to be a smectic phase by the observation of the optical texture thereof. Also, the intermediate phase thereof was further confirmed to be a smectic phase from the fact of existence of scattered peaks in a small angle region as the results of the X-ray diffraction analysis.

Furthermore, in the high molecular liquid crystal obtained, the light emission of fluorescence composed of two peaks (415 nm and 470 nm) was observed.

EXAMPLE 2

A high molecular liquid crystal having the same structure as that in Example 1, wherein the average content of trans type bonds to all the carbon-carbon double bonds was 72%, was obtained by the following method.

(1) Synthesis

To a benzene solution of a polymer obtained by the same reaction as in Example 1 was added a small amount of iodine and the mixture was refluxed for 15 minutes at 80° C. to provide a polyester having an average content of trans type bonds of 72%.

The average content (Ct) of the trans type bonds in the polymer thus-obtained was confirmed to be 72% by the measurement of NMR. Also, the number average molecular weight of the polymer obtained was 12,000 by gel permeation chromatography.

Also, the product obtained was confirmed to be a polymer having the structure shown in Example 1 as the recurring unit by the infrared absorption analysis, elemental analysis, NMR, etc.

(2) Characteristics

By investigating the thermal characteristics of the high molecular liquid crystal obtained by the aforesaid method using a differential scanning calorimeter, the endothermic peak corresponding to the transition point from a solid phase to an intermediate phase and the endothermic peak corresponding to the transition point from an intermediate phase to an isotropic fluid phase were observed at 175° C. and 246° C., respectively, in the temperature raising course.

Also, as the result of the investigations by a heating type polarization microscope, the intermediate phase of the high molecular liquid crystal was confirmed to be a smectic phase by the observation of the optical texture thereof. Furthermore, the intermediate phase was also confirmed to be a smectic phase by the fact of the existence of scattered peaks in a small angle region as the result of the X-ray diffraction analysis.

EXAMPLE 3

A high molecular liquid crystal having the moiety shown by the following structural formula as the recurring unit, wherein all the carbon-carbon double bonds were trans type bonds, was obtained by the following method.

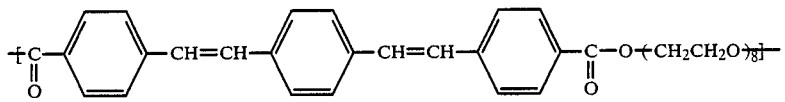

(1) Synthesis

A polymer was synthesized by following the same procedure as in Example 1 except that octaethylene glycol [HO(CH$_2$CH$_2$O)$_8$H] was used in place of tetraethylene glycol at a mol ratio of BECSB to octaethylene glycol of 1:1.3 and the polymer was isomerized by adding a small amount of iodine to the benzene solution of the polymer and refluxing the solution for 24 hours while maintaining the solution at a boiling point of benzene.

The average content (Ct) of the trans type bonds in the polymer thus-obtained was almost 100%.

The number average molecular weight of the polymer obtained was 23,000 by gel permeation chromatography.

Also, the product obtained was confirmed to be a polymer having the aforesaid structure as the recurring unit by the infrared absorption analysis, elemental analysis, NMR, etc.

(2) Characteristics

As the results of the investigations of the thermal characteristics of the high molecular liquid crystal obtained by the aforesaid method by means of a differential scanning calorimeter, the endothermic peak corresponding to the transition point from a solid phase to an intermediate phase, the endothermic peak corresponding to the transition point from the intermediate phase to another intermediate phase, and the endothermic peak corresponding to the transition point from the latter intermediate phase to an isotropic fluid phase were observed at 126° C., 146° C., and 186° C., respectively, in the temperature raising course.

Also, as the result of the investigations by a heating type polarization microscope, the intermediate phases of the high molecular liquid crystal were confirmed to be a smectic phase by the observation of the optical texture thereof. Furthermore, the intermediate phases were also confirmed to be a smectic phase by the fact of the existence of scattered peaks in a small angle region as the results of the X-ray diffraction analysis.

Also, by irradiating the polymer with ultraviolet rays, a green fluorescence emission was observed.

EXAMPLE 4

A polymer liquid crystal having the moiety shown by the following structural formula as the recurring unit was obtained by following the same procedure as in Example 3 using 2,300 g of 9,10-bis(chloromethyl)-anthracene in place of p-xylylene dichloride.

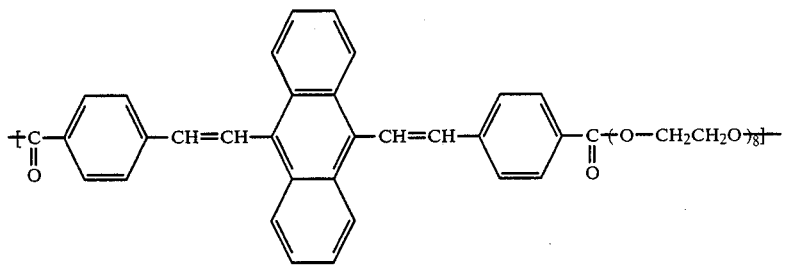

The high polymer liquid crystal thus obtained had yellow fluorescence emitting characteristics.

EXAMPLE 5

A high molecular liquid crystal having the moiety shown by the following structure as the recurring unit was obtained by following the same procedure as in Example 3 using 2,100 g of 1,1'-bis(chloromethyl)biphenyl in place of p-xylylene dichloride.

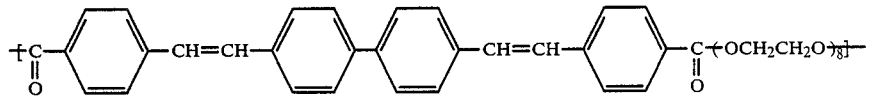

While the invention has been described in detail and with reference to specific embodiments thereof, it will be apparent to one skilled in the art that various changes and modifications can be made therein without departing from the spirit and scope thereof.

What is claimed is:

1. An organic high molecular liquid crystal containing a moiety represented by the following structural formula (1) as the recurring unit and having a number average molecular weight of from 1,000 to 100,000:

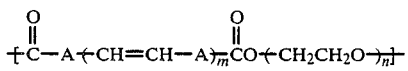 (1)

wherein m represents an integer of from 2 to 10; n represents an integer of from 1 to 12; and —A— is selected from the group consisting of

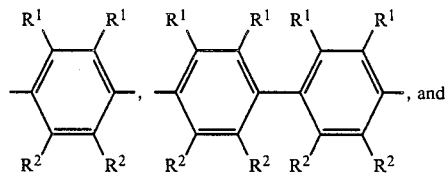, and

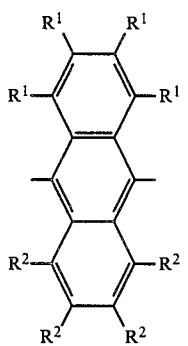

(wherein $R^1$ and $R^2$ each is selected from the group consisting of a hydrogen atom, a halogen atom, an alkyl group having 1 to 3 carbon atoms, an amino group, a methyl-substituted amino group, an alkoxy group having 1 to 3 carbon atoms, a cyano group, and a nitro group).

2. The organic high molecular liquid crystal as claimed in claim 1, wherein $R^1$ and $R^2$ each is a hydrogen atom.

3. The organic high molecular liquid crystal as claimed in claim 1, wherein —A— is

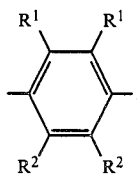

4. The organic high molecular liquid crystal as claimed in claim 1, wherein $R^1$ is selected from the group consisting of a hydrogen atom, a methyl group and a methoxy group; and $R^2$ is selected from the group consisting of a hydrogen atom, a cyano group and a nitro group.

5. The organic high molecular liquid crystal as claimed in claim 1, wherein m is 2 or 3.

6. The organic high molecular liquid crystal as claimed in claim 1, wherein n is from 2 to 8.

7. The organic high molecular liquid crystal as claimed in claim 1, wherein the average content (Ct) of trans type bonds to carbon-carbon double bonds in the structural formula (1) is at least 60%.

8. The organic high molecular liquid crystal as claimed in claim 1, wherein the average content (Ct) of trans type bonds to carbon-carbon double bonds in the structural formula (1) is at least 80%.

9. The organic high molecular liquid crystal as claimed in claim 1, wherein the number average molecular weight is from 3,000 to 70,000.

10. The organic high molecular liquid crystal as claimed in claim 1, wherein the transition temperature from a solid phase to an intermediate phase (liquid crystal phase) is at least 50° C.

11. The organic high molecular liquid crystal as claimed in claim 1, wherein the transition temperature from a solid phase to an intermediate phase (liquid crystal phase) is from 60° C. to 300° C.

* * * * *